Feb. 8, 1966 A. W. MASSMAN 3,234,328

TELEVISION RECEIVER

Filed March 1, 1963

INVENTOR.
ALBERT W. MASSMAN
BY Mueller & Aichele
ATTYS.

3,234,328

Patented Feb. 8, 1966

United States Patent Office 3,234,328

TELEVISION RECEIVER

Albert W. Massman, Wheaton, Ill., assignor to Motorola, Inc., Chicago, Ill., a corporation of Illinois Filed Mar. 1, 1963, Ser. No. 262,015
12 Claims. (Cl. 178—7.3)

Figures 1, 2:
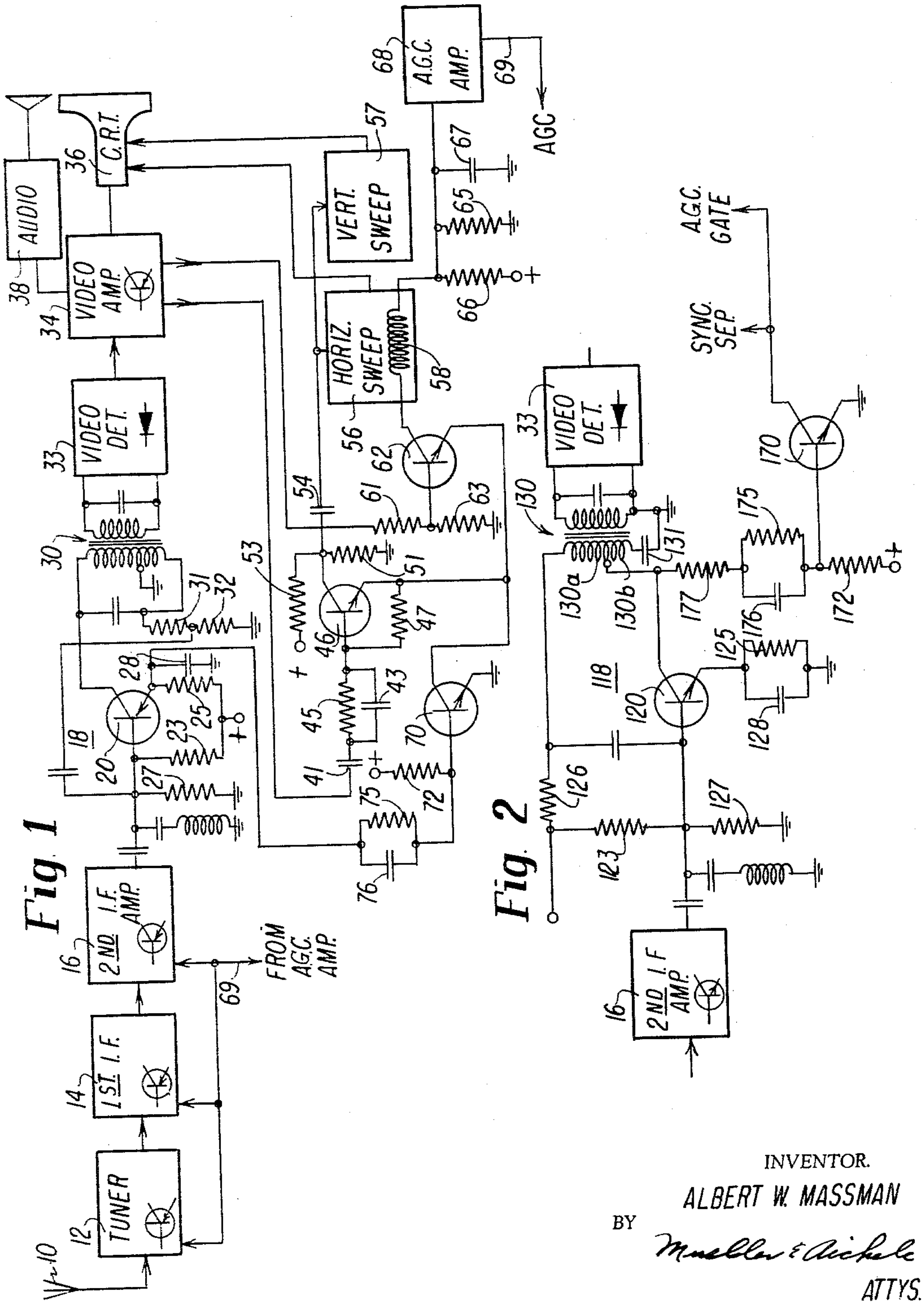

The present invention relates generally to transistorized television receivers and in particular to improved circuit means for noise gating the synchronizing signal separator and automatic gain control circuits of the receiver so that such circuits are not subjected to adverse effects resulting from noise charge-up in the presence of high level impulse noise.

Television signals are transmitted with a video component and a synchronizing signal component, with synchronizing signals rising above the maximum level of the modulation imparted to the video component, by the video information. Accordingly, means must be provided in the receiver to extract the synchronizing signals from the composite video signal for coupling to the horizontal and vertical sweep circuits. Such means conventionally includes a synchronizing signal separator circuit which is essentially a limiting amplifier that produces an output when input signals exceed a predetermined level. In a transistorized receiver the synchronizing signal separator circuit incorporates a transistor and an input network which includes a series capacitor coupling the composite video signal to the input electrode thereof, and a resistor shunting the input electrode of the transistor to a reference potential. This arrangement provides self-biasing, allowing the synchronizing signal separator transistor to conduct to produce output synchronizing pulses in the presence of the synchronizing signal component of the composite video signal. The series input capacitor receives and maintains a charge which is subsequently discharged through the shunting resistor to provide reverse biasing so that the transistor is held nonconductive during the intervals between synchronizing signals, when video information signals are received.

It is also conventional practice to produce an automatic gain control signal for the receiver which is proportional to the level of the synchronizing signal component of the composite video signal so that receiver gain is independent of video information signals, thereby insuring that picture brightness does not fluctuate with incoming signal level. In a transistorized receiver the input transistor for the AGC system is time gated by pulses derived from the horizontal sweep circuit so that the composite video signal is sampled only when synchronizing signals are present. To avoid rapid gain fluctuations a parallel resistance-capacitance network is provided in the output of the AGC gating transistor, with a time constant selected to produce desired response for the AGC system.

It is apparent that both the synchronizing signal separator circuit and the AGC circuit of the receiver are receptive to high level impulse noise which is of the same polarity and which occurs in time coincidence with the synchronizing signals. Such noise impulses may excessively charge the series capacitor in the synchronizing signal separator circuit to thereby keep it biased to nonconduction during reception of subsequent synchronizing signals so that synchronization is lost, and may charge the resistance-capacitance network of the AGC circuit so that the gain of the receiver is set at an undesired level for extended periods of time.

It has been proposed to utilize control devices such as vacuum tubes or transistors in a noise gate circuit to disable the synchronizing signal separator and the AGC gate for individual synchronizing signals of the detected composite video which contain impulse noise exceeding a predetermined level. However, it is necessary in such circuits to provide a reference level which varies with the strength of the composite video signal so that strong video information signals and synchronizing signals will not cause them to become disabled, and this requires the use of additional biasing arrangements and level setting circuitry. In addition, noise is compressed by filtering action of the video detector and subsequent video amplification stages so that noise impulses appearing in the detected composite video signal are of a reduced level to further add to the difficulty of distinguishing noise from high level synchronization signals and video information signals.

It is therefore among the objects of the present invention to provide an improved transistorized television receiver which is less susceptible to the adverse effects of impulse noise accompanying the received television signal.

Another object is to provide a transistorized television receiver which incorporates an improved noise gate circuit to prevent the automatic gain control and the synchronous signal separator circuits of the receiver from becoming excessively charged by high level impulse noise.

Another object is to provide a simple and effective circuit for use in a transistorized television receiver to disable the synchronizing signal separator and the automatic gain control circuits thereof in the presence of high level impulse noise.

A feature of the present invention is the provision of a noise gate circuit to control the series conduction of the synchronizing signal separator transistor and the AGC gating transistor of a transistorized television receiver. Detected noise impulses are derived from an intermediate frequency stage of the receiver and are coupled to the noise gate circuit to disable the synchronizing signal separator transistor and the AGC gating transistor in the presence of impulse noise exceeding the maximum level of synchronizing signal components.

Another feature is the provision of a noise gate circuit including a transistor series connected in the conductive path of the synchronizing signal separator and AGC gating transistors of a transistorized television receiver, and of circuit means including the junction diode formed by regions of opposite conductivity of an intermediate frequency amplifying transistor of the receiver for supplying detected peaks of noise impulses exceeding a predetermined level to the noise gate circuit, which circuit is operative to disable the synchronizing signal separator and the AGC gating transistors to prevent noise charge-up of the time constant networks associated therewith.

A further feature is the provision, in a noise gate circuit of the above-described type, of circuit means to maintain the transistor thereof in saturated conduction to provide a low impedance in the series conduction paths of the synchronizing signal separator and AGC transistors, and of circuit means to cause such transistor to be rapidly switched to non-conduction when noise impulses in the intermediate frequency stages of the receiver exceeds the maximum level of synchronizing signals of the receiver to prevent such impulses from paralyzing the synchronizing signal separator circuit and disturbing the AGC circuit.

Still another feature of the invention is the provision of a noise gate circuit of the above described type wherein noise impulses exceeding a predetermined level are detected by one of the junction diodes formed by regions of opposite conductivity type of a transistor in an IF stage of the receiver, with signals at IF frequency bypassed so that the noise gate input receives only detected noise peaks, and with video and synchronizing signals excluded therefrom.

Further objects, features and attending advantages of the invention will become apparent from the following description when taken in conjunction with the accompanying drawings, in which:

FIG. 1 is a circuit, partly in block and partly in schematic form, of a transistorized television receiver incorporating an embodiment of the invention; and FIG. 2 is a circuit illustrating a further embodiment of the invention.

In practicing the invention there is provided a transistorized television receiver which includes a synchronizing signal separator transistor and an AGC gating transistor, each having an input electrode coupled to video amplifier stages so that a signal representative of the detected composite video signal is applied thereto. The synchronizing signal separator transistor includes a self-biasing input network having a series coupling capacitor and an input electrode return resistor, and is rendered conductive only by the peak amplitude of synchronizing signals. The series coupling capacitor retains a charge, and discharge current through the input electrode return resistor maintains a reverse bias to hold the transistor non-conductive during intervals between individual synchronizing signals allowing it to conduct only in the presence of signals or pulses exceeding the blanking level of the composite video signal. The AGC system of the receiver includes a transistor which is gated into conduction by pulses obtained from the horizontal sweep circuit, which in turn is synchronized by the synchronizing signals, to provide an automatic gain control signal which is proportional to the level of the synchronizing signal component of the composite video signal.

The noise gate circuit includes a transistor series connected in the conductive paths of the synchronizing signal separator transistor and the AGC gating transistor, and is provided with a signal derived from an IF stage of the receiver to disable such circuits in the presence of high level impulse noise. The transistor of the noise gate circuit is normally biased to saturated conduction to present a low impedance path in series with the synchronizing signal separator transistor and the AGC gating transistor, and is rapidly switched to cutoff by high level noise impulses detected by an IF transistor. The diode formed by the junction between regions of opposite conductivity of the IF transistor, such as its base-to-emitter diode or its base-to-collector diode, detects noise impulses of a level sufficient to drive it into saturated conduction, with such a level exceeding the peak amplitude of synchronization signals. An IF bypass is provided so that video information signals and synchronizing signals are excluded from the noise gate circuit, and the necessity for critical level control of the transistor of the noise gate circuit is eliminated. Further, the noise is less compressed at this point so that the ratio of impulse noise to synchronizing signals is greater for high sensitivity of the noise gate circuit.

Referring now to FIG. 1, television signals received at antenna 10 are fed to the input of tuner 12, which is a conventional television tuner and may include a plurality of transistorized RF amplification stages, as well as the local oscillator and mixer or first detector. Signals appearing at the output of tuner 12 are coupled by first and second intermediate frequency amplifier stages 14 and 16 to the input base electrode of transistor 20 of third intermediate frequency amplifier stage 18.

As shown, third intermediate amplifier stage 18 may include a PNP transistor with operating voltages supplied to the base and emitter electrodes thereof through resistors 23 and 25, respectively, from a source of positive potential. Resistor 27, connected between the base electrode of transistor 20 and ground, forms a voltage divider with resistor 23 to bias the transistor 20 to a given quiescent operating point. Typically for a PNP transistor the emitter is slightly positive with respect to the base. Capacitor 28 provides a bypass for the emitter electrode of transistor 20 to ground for intermediate frequency signals. In conjunction with resistor 25, capacitor 28 forms a filter network which is selective to signals of intermediate frequency (40 mc. in a television receiver), and tends to reject signals having lower frequency components. The collector electrode of transistor 20 is connected to ground through the primary winding of IF transformer 30 and resistors 31 and 32.

Transformer 30, having a tuned input and output, couples the IF signal appearing at the output of collector electrode of transistor 20 to video detector stage 33. The detected composite video signal is then coupled by video frequency amplifier 34, which may include one or more transistor stages direct coupled as video frequency amplifiers, to the cathode of cathode ray tube 36. The audio subcarrier is derived from video amplifier 34 and fed to audio system 38 in the manner known in the art.

A portion of the detected composite video signal is also fed from video amplifier 34 through series coupling capacitor 41 and the RC network including capacitor 43 in parallel with resistor 45 to the input base electrode of synchronizing signal separator transistor 46. Resistor 47, of a relatively high value with respect to the value of resistor 45, is connected between the base electrode and emitter electrodes of transistor 46, and in conjunction with capacitor 41 provides an input self-biasing network for transistor 46. Resistor 51 connects the collector electrode of transistor 46 to ground reference potential and collector operating voltage is supplied through resistor 53. For the NPN transistor shown this voltage is derived from a positive source and should be sufficiently positive to prevent reverse base-to-collector conduction for positive going signals on the base of transistor 46.

Input signals which exceed the maximum level of the video component of the composite video signal, such as synchronizing signals, cause transistor 46 to conduct, developing pulses across resistor 51 which are coupled by capacitor 54 to horizontal sweep circuit 56 and vertical sweep circuit 57. These circuits produce deflection voltages which are supplied to the deflection yokes of cathode ray tube 36 in the conventional manner.

A portion of the composite video signal developed in video amplifier 34 is further fed through resistor 61 to the input base electrode of AGC gating transistor 62. Resistor 63 forms a voltage divider with resistor 61 so that when direct current coupled to the video output stage in video amplifier 34, transistor 62 is normally biased to cutoff for a given collector operating potential. The collector electrode of transistor 62 is series connected through winding 58 on the horizontal output transformer of horizontal sweep circuit 57 to the junction point between resistors 65 and 66. Resistor 65 has the other end thereof connected to ground reference potential while the other end of resistor 66 is connected to a source of collector voltage for transistor 46. For the NPN transistor shown this voltage is positive and of a sufficient magnitude to prevent reverse conduction of the base-to-collector diode of transistor 62 when positive going composite video signals are applied to its base electrode. Capacitor 67 is connected in shunt with resistor 65.

Positive going horizontal output pulses coupled to the collector electrode of transistor 62 by winding 58 cause transistor 62 to conduct, and accordingly concurrently occurring synchronizing signals of the synchronizing signal component of the composite video signal coupled to the base electrode of transistor 62 allows the charge on capacitor 67 to be adjusted in response thereto. The time constant provided between resistor 65 and capacitor 67 retain this charge a predetermined time and an AGC voltage is built up in proportion to the level of the syncronization signal portion of the composite video signal. This AGC voltage is filtered and amplified by AGC amplifier 68 and supplied on AGC bus 69 to selected RF stages in tuner 12 and to first and second IF amplification stages 14 and 16 to provide AGC action in the conventional manner.

The emitter electrode of each of transistors 46 and 62 are connected to the collector electrode of noise gate transistor 70. The emitter electrode of transistor 70 is directly connected to ground reference potential. Thus the emitter return for each of transistors 46 and 62 is through the collector-to-emitter junction of transistor 70 to ground reference potential. The base electrode of transistor 70 is connected by resistor 72 to a biasing potential source, which is positive for the NPN transistor shown, and is biased to draw sufficient base-to-emitter current so that transistor 70 will be maintained in a state of saturated conduction for a positive voltage applied to its collector electrode. Accordingly, when transistor 46 is rendered conductive by synchronizing signals, or when transistor 62 is rendered conductive by pulses coupled to its collector electrode from the horizontal output transformer of horizontal sweep circuit 56, the positive potential appearing at their collector electrodes is reflected to the collector electrode of transistor 70 and returned to ground reference potential through the collector-to-emitter path of transistor 70 by virtue of its saturated conduction.

The base electrode of transistor 70 is further coupled by the RC network including resistor 75 and capacitor 76 to the emitter electrode of transistor 20 in third intermediate frequency amplifier stage 18. The AGC provided to earlier stages, such as the RF amplifiers in tuner 12 and IF stages 14 and 16, results in a signal level in IF stage 18 which is substantially independent of incoming signal strength. By selection of its operating point the dynamic range of transistor 20 is adjusted so that the IF signal swing is just short of saturation for the maximum level of synchronizing signals, and in the absence of bursts of impulse noise exceeding this level. As previously mentioned, the emitter electrode of transistor 20 is bypassed to ground reference potential by capacitor 28 for signals of intermediate frequency. Thus in the absence of high level impulse noise the input of noise gate transistor 70 is not changed and synchronizing signal separator transistor 46 and AGC gating transistor 62 are allowed to function in a normal manner. Because of bypassing of the emitter electrode of transistor 20 for signal of intermediate frequency video information signals and synchronizing signals are prevented from influencing the conductive state of transistor 70.

However, impulse noise of an appreciable magnitude appearing in IF stage 18 tends to drive transistor 20 into saturation and thus into the range of non-linear operation. As a result, the peaks of noise impulses exceeding the level of synchronizing signals are detected by the base-to-emitter diode of transistor 20 to provide negative going pulses across capacitor 28. Since the emitter bypass provided at this point is relatively selective to intermediate frequencies, a substantial portion of the detected noise impulses, particularly components thereof lower in frequency than the intermediate frequency, are coupled through the RC circuit of resistor 75 and capacitor 76 to the base electrode of noise gate transistor 70. Capacitor 76 has a large value to pass relatively low frequency components of the detected noise peaks and the charge build up and retained by the time constant between capacitor 76 and resistor 75 provides a negative potential at the base electrode of transistor 70 to drive it out of saturation and into cutoff.

When transistor 70 is cutoff the emitter return for transistors 46 and 62 to ground reference potential is provided with a high series impedance and accordingly neither one of these transistors is allowed to conduct. In the case of transistor 46 this prevents charging of series coupling capacitor 41 and in the case of transistor 62 this prevents charging of capacitor 67 by synchronizing signals. Accordingly, individual synchronizing signals which are accompanied by high level impulse noise are prevented from paralyzing the synchronizing signal separator circuit and from providing a level set in the AGC circuit.

It is to be noted that in the circuit of FIG. 1, negative going noise peaks are detected by the base-to-emitter diode of PNP transistors in the IF stages of the receiver. In applications where NPN IF transistors are utilized, negative going noise peaks may be derived from the base-to-collector diode as shown in FIG. 2. A voltage dividing arrangement including resistor 123, connected between a source of positive potential and the base electrode of IF transistor 120, and resistor 127, connected from its base electrode to ground reference potential, provides quiescent bias for third IF stage 118. The emitter electrode of resistor 120 is returned to ground reference potential by resistor 125, suitably bypassed by capacitor 128. Collector voltage is supplied through the circuit including load resistor 126 and upper portion 130*a* of the primary winding of IF coupling transformer 130 to the collector electrode of transistor 120. A lower winding 130*b* on the primary of transformer 130 is series connected with capacitor 131 to ground reference potential to provide a bypass selectively tuned to IF frequency. Variations in current through collector resistor 126 produces IF signals in portion 130*a* of the primary of IF coupling transformer 130 which are coupled to video detector circuit 33. The base electrode of noise gate transistor 170 is connected to the RC network of resistor 175 and capacitor 176 and hence to the collector electrode of transistor 120 by resistor 177.

When driven into saturation by high level impulse noise, the peaks thereof are detected by reverse conduction of the base-to-collector diode of transistor 120 and negative going pulses are developed across resistor 177. These detected noise peaks are coupled through the RC network of resistor 175 and capacitor 176 to the base electrode of transistor 170 to drive it out of saturation and into cutoff. Accordingly the emitter return of transistors 46 and 62 is provided with a high series impedance to prevent noise charge-up in the synchronizing signal separator circuit and the AGC gating circuit in the manner previously described.

The invention provides therefore a transistorized television receiver with improved circuit means for noise gating of the synchronizing signal separator and AGC circuits to prevent noise charge-up. Rapid switching action is provided to disable these circuits in the presence of individual synchronizing signals containing a high level of impulse noise. Detected noise peaks are derived from one of the junction diodes formed by regions of opposite conductivity in an IF transistor at a point which is bypassed for IF frequencies to exclude the composite video signal from the noise gate.

While particular embodiments of the invention have been shown and described, modifications thereof may be made and it is intended in the appended claims to cover all such modifications as fall within the true spirit and scope of the invention.

I claim:

1. In a receiver having a plurality of stages for receiving a television signal which includes a video signal component and a synchronizing signal component of an amplitude exceeding the peak amplitude of the video signal component, and which may include noise bursts of an amplitude exceeding the peak amplitude of the synchronizing signal component, the combination including: means for receiving said television signal and converting the same to an intermediate frequency signal; an intermediate frequency amplifier including a signal translating transistor having a plurality of electrodes and bias means so that said transistor is driven into saturated conduction by said noise bursts, said transistor having a junction diode formed by adjacent regions of opposite conductivity type providing detected noise peaks at one of said electrodes; means connected between said one electrode and a reference potential for providing a bypass for said intermediate frequency signal; means including a video detector coupled with said intermediate frequency amplifier for providing a composite video signal, which composite video signal includes a synchronizing signal component of a given polarity and which may include impulse noise of the same polarity; means including a video amplifier stage for coupling said composite video signal to utilization means; automatic gain control circuit means including a time gated transistor having input, output and common electrodes, with said input electrode coupled to said video amplifier stage to derive a composite video signal therefrom and said output electrode coupled to circuit means for applying a gain control signal to selective stages of the receiver; a noise gate transistor having input, output and common electrodes, with said output and common electrodes series connected between the common electrode of said time gated transistor and a reference potential; means for biasing said noise gate transistor to a state of saturated conduction; and means coupling the input electrode of said noise gate transistor to said one electrode of the signal translating transistor of said intermediate frequency amplifier, with said detected noise peaks causing said noise gate transistor to become non-conductive, thereby disabling said time gated transistor in the presence of noise bursts exceeding the level of the synchronizing signal component of said composite video signal.

2. In a receiver having a plurality of stages for receiving a television signal which includes a video signal component and a synchronizing signal component of an amplitude exceeding the peak amplitude of the video signal component, and which may include noise bursts of an amplitude exceeding the peak amplitude of the synchronizing signal component, the combination including: means for receiving said television signal and converting the same to an intermediate frequency signal; an intermediate frequency amplifier including a signal translating transistor having a plurality of electrodes and bias means so that said transistor is driven into saturated conduction by said noise bursts, said transistor having a junction diode formed by adjacent regions of opposite conductivity type providing detected noise peaks at one of said electrodes; means connected between said one electrode and a reference potential for providing a bypass for said intermediate frequency signal; means including a video detector coupled with said intermediate frequency amplifier for providing a composite video signal, which composite video signal includes a synchronizing signal component of a given polarity and which may include noise impulses of the same polarity; means including a video amplifier stage for coupling said composite video signal to utilization means; synchronizing signal separator circuit means including a transistor having input, output and common electrodes; circuit means including a self-biasing network coupling the input electrode of said synchronizing signal separator transistor to said video amplifier stage to derive a composite video signal therefrom; a noise gate transistor having input, output and common electrodes, with said output and common electrodes series connected between the common electrode of said synchronizing signal separator transistor and a reference potential; means for biasing said noise gate transistor to a stage of saturated conduction; and means coupling the input electrode of said noise gate transistor to said one electrode of the signal translating transistor of said intermediate frequency amplifier, with said detected noise peaks causing said noise gate transistor to become non-conductive, thereby disabling said synchronizing separator transistor in the presence of noise bursts exceeding the level of the synchronizing signal component of said composite video signal.

3. In a receiver having a plurality of stages for receiving a television signal which includes a video signal component and a synchronizing signal component of an amplitude exceeding the peak amplitude of the video signal component, and which may include noise bursts of an amplitude exceeding peak amplitude of the synchronizing component, the combination including: means for receiving said television signal and converting the same to an intermediate frequency signal; an intermediate frequency amplifier including a signal translating transistor having a plurality of electrodes and bias means so that said transistor is driven into saturated conduction by said noise bursts, said transistor having a junction diode formed by adjacent regions of opposite conductivity type providing detected noise peaks at one of said electrodes; means connected between said one electrode and a reference potential for providing a bypass for said intermediate frequency signal; means including a video detector coupled with said intermediate frequency amplifier for providing a composite video signal, which composite video signal includes a synchronizing signal component of a given polarity and which may include noise impulses of the same polarity; means including a video amplifier stage for coupling said composite video signal to utilization means; automatic gain control circuit means including a time gated transistor having input, output and common electrodes, with said input electrode coupled to said video amplifier stage to derive a composite video signal therefrom and said output electrode coupled to circuit means for applying a gain control signal to selective stages of the receiver; synchronizing signal separator circuit means including a transistor having input, output and common electrodes; circuit means including a self-biasing network coupling said input electrode to said video amplifier stage; a noise gate transistor having input, output and common electrodes, with said output and common electrodes series connected betwen the common electrodes of said time gated transistor and said synchronizing signal separator transistor and a reference potential; means for biasing said noise gate transistor to a state of saturated conduction; and means coupling the input electrode of said noise gate transistor to said one electrode of the signal translating transistor of said intermediate frequency amplifier, with said detected noise peaks causing said nose gate transistor to become non-conductive, thereby disabling said time gated transistor in said synchronizing signal separator transistor in the presence of noise bursts exceeding the level of the synchronizing signal component of said composite video signal.

4. In a transistorized television receiver for television signals which include a video signal component and a synchronizing signal component of an amplitude exceeding the peak amplitude of the video signal component, and which may include noise bursts of an amplitude exceeding the peak amplitude of the synchronizing signal component, the combination including: means for receiving said television signals and converting the same to an intermediate frequency signal; an intermediate frequency amplifier including a signal translating transistor having emitter, base and collector electrodes, which transistor is adapted to be driven into saturated conduction by said noise bursts, with said noise bursts being detected by the emitter-to-base diode of said signal translating transistor; means connected to the emitter electrode of said signal translating transistor to provide a bypass to ground reference potential for said intermediate frequency signal; means including a video detector coupled with said intermediate frequency amplifier for providing a composite video signal, which signal includes synchronizing signals of a given polarity and which may include noise impulses of the same polarity; means including a video amplifier stage for coupling said composite video signal to utilization means; automatic gain control circuit means including a time gated transistor having base, collector and emitter electrodes, with the base electrode of said time gated transistor coupled to said video amplifier stage to derive a composite video signal therefrom, and with the collector electrode of said time gated transistor coupled to circuit means for applying a gain control signal to selected stages of the receiver; a noise gate transistor having base, collector and emitter electrodes, with the collector and emitter electrodes of said noise gate transistor series connected between the emitter electrode of said time gated transistor and a reference potential; means for biasing said noise gate transistor to produce a state of saturated conduction therein in the presence of synchronizing signals at the input electrode of said time gated transistor; and means for coupling the input electrode of said noise gate transistor to said emitter electrode of the signal translating transistor of said intermediate frequency amplifier to derive detected noise bursts therefrom, with said detected noise bursts having polarity to cause said noise gate transistor to become non-conductive, thereby disabling said time gated transistor in the presence of such noise bursts.

5. In a transistorized television receiver for television signals which includes a video signal component and a synchronizing signal component of an amplitude exceeding the peak amplitude of the video signal component, and which may include noise bursts of an amplitude exceeding the peak amplitude of the synchronizing signal component, the combination including: means for receiving said television signals and converting the same to an intermediate frequency signal; an intermediate frequency amplifier including a signal translating transistor having emitter, base, collector electrodes, which transistor is adapted to be driven into saturated conduction by said noise bursts, with said noise bursts being detected by the emitter-to-base diode of said signal translating transistor; means connected to the emitter electrode of said signal translating transistor to provide a bypass to ground reference potential for said intermediate frequency signal; means including a video detector coupled with said intermediate frequency amplifier for providing a composite video signal, which signal includes synchronizing signals of a given polarity and which may include noise impulses of the same polarity; means including a video amplifier stage for coupling said composite video signal to utilization means; circuit means including a synchronizing signal separator transistor having base, collector and emitter electrodes, with a self-biasing network coupling the base electrode of said synchronizing signal separator transistor to said video amplifier stage to derive a composite video signal therefrom, said synchronizing signal separator transistor responsive to said composite video signal to produce synchronizing pulses at the output electrode thereof in the presence of synchronizing signals; a noise gate transistor having base, collector and emitter electrodes, with the collector and emitter electrodes of said noise gate transistor series connected between the emitter electrode of said synchronizing signal separator transistor and a reference potential; means for biasing said noise gate transistor to produce a state of saturated conduction therein in the presence of synchronizing signals at the input electrode of said synchronizing signal separator transistor; and means for coupling the input electrode of said noise gate transistor to said emitter electrode of the signal translating transistor of said intermediate frequency amplifier to derive detected noise bursts therefrom, with said detected noise bursts having polarity to cause said noise gate transistor to become non-conductive, thereby disabling said synchronizing signal separator transistor in the presence of such noise bursts.

6. In a transistorized television receiver for television signals which include a video signal component and a synchronizing signal component of an amplitude exceeding the peak amplitude of the video signal component, and which may include noise bursts of an amplitude exceeding the peak amplitude of the synchronizing signal component, the combination including: means for receiving said television signals and converting the same to an intermediate frequency signal; an intermediate frequency amplifier including a signal translating transistor having emitter, base and collector electrodes, which transistor is adapted to be driven into saturated conduction by said noise bursts, with said noise bursts being detected by the emitter-to-base diode of said signal translating transistor; means connected to the emitter electrode of said signal translating transistor to provide a bypass to ground reference potential for said intermediate frequency signal; means including a video detector coupled with said intermediate frequency amplifier for providing a composite video signal, which signal includes synchronizing signals of a given polarity and which may include noise impulses of the same polarity; means including a video amplifier stage for coupling said composite video signal to utilization means; automatic gain control circuit means including a time gated transistor having base, collector and emitter electrodes, with the base electrode of said time gated transistor coupled to said transistor video amplifier stage to derive a composite video signal therefrom, and with the collector electrode of said time gated transistor coupled to circuit means for applying a gain control signal to selected stages of the receiver; circuit means including a synchronizing signal separator transistor having base, collector and emitter electrodes, with a self-biasing network coupling the base electrode of said synchronizing signal separator transistor to said video amplifier stage to derive a composite video signal therefrom, said synchronizing signal separator transistor responsive to said composite video signal to produce output synchronizing pulses in the presence of synchronizing signals; a noise gate transistor having base, collector and emitter electrodes, with the collector and emitter electrodes of said noise gate transistor series connected between the emitter electrodes of said time gated transistor and said synchronizing signal separator transistor and a reference potential; means for biasing said noise gate transistor to produce a state of saturated conduction therein in the presence of synchronizing signals at the input electrodes of said time gated transistor and said synchronizing signal separator transistor; and means for coupling the input electrode of said noise gate transistor to said emitter electrode of the signal translating transistor of said intermediate frequency amplifier to derive detected noise bursts therefrom, with said detected noise bursts being of a polarity to cause said noise gate transistor to become non-conductive, thereby disabling said time gated transistor and said synchronizing signal separator transistor in the presence of said noise bursts.

7. In a transistorized television receiver for television signals which include a video signal component and a synchronizing signal component of an amplitude exceeding a peak amplitude of the video signal component, and which may include noise bursts of an amplitude exceeding the peak amplitude of the synchronizing signal component, the combination including: means for receiving said television signals and converting the same to an intermediate frequency signal; an intermediate frequency amplifier including a signal translating transistor having emitter, base and collector electrodes, which transistor is adapted to be driven into saturated conduction by said noise bursts, with said noise bursts being detected by the base-to-collector diode of said signal translating transistor; means connected to the collector electrode of said signal translating transistor to provide a bypass to ground reference potential for said intermediate frequency signal; means including a video detector coupled with said intermediate frequency amplifier for providing a composite video signal, which signal includes synchronizing signals of a given polarity and which may include noise impulses of the same polarity; means including a video amplifier stage for coupling said composite video signal to utilization means; automatic gain control circuit means including a time gated transistor having base, collector and emitter electrodes, with the base electrode of said time gated transistor coupled to said video amplifier stage to derive a composite video signal therefrom, and with the collector electrode of said time gated transistor coupled to circuit means for applying a gain control signal to selected stages of the receiver; a noise gate transistor having base, collector and emitter electrodes, with the collector and emitter electrodes of said noise gate transistor series connected between the emitter electrode of said time gated transistor and a reference potential; means for biasing said noise gate transistor to produce a state of saturated conduction therein in the presence of synchronizing signals at the input electrode of said time gated transistor; and means for coupling the input electrode of said noise gate transistor to the collector electrode of said signal translating transistor of said intermediate frequency amplifier to derive detected noise bursts therefrom, with said detected noise bursts having a plurality to cause said noise gate transistor to become non-conductive, thereby disabling said time gated transistor in the presence of such noise bursts.

8. In a transistorized television receiver for television signals which include a video signal component and a synchronizing signal component of an amplitude exceeding the peak amplitude of the video signal component, and which may include noise bursts of an amplitude exceeding the peak amplitude of the synchronizing signal component, the combination including: means for receiving said television signals and converting the same to an intermediate frequency signal; an intermediate frequency amplifier including a signal translating transistor having emitter, base and collector electrodes, which transistor is adapted to be driven into saturated conduction by said noise bursts, with said noise bursts being detected by the base-to-collector diode of said signal translating transistor; means connected to the collector electrode of said signal translating transistor to provide a bypass to ground reference potential for said intermediate frequency signal; means including a video detector coupled with said intermediate frequency amplifier for providing a composite video signal, which signal includes synchronizing signals of a given polarity and which may include noise impulses of the same polarity; circuit means including a video amplifier stage for coupling said composite video signal to utilization means; circuit means including a synchronizing signal separator transistor having base, collector and emitter electrodes, with a self-biasing network coupling the base electrode of said synchronizing signal separator transistor to said video amplifier stage, said synchronizing signal separator transistor responsive to said composite video signal to produce output synchronizing pulses in the presence of the synchronizing signal component thereof; a noise gate transistor having base, collector and emitter electrodes, with the collector and emitter electrodes of said noise gate transistor series connected between the emitter electrode of said synchronizing signal separator transistor and a reference potential; means for biasing said noise gate transistor to produce a state of saturated conduction therein in the presence of synchronizing signals at the input electrode of said synchronizing signal separator transistor; and means for coupling the input electrode of said noise gate transistor to said collector electrode of the signal translating transistor of said intermediate frequency amplifier to derive detected noise bursts therefrom, with said detected noise bursts being of a plurality to cause said noise gate transistor to become non-conductive, thereby disabling said synchronizing signal separator transistor in the presence of said noise bursts.

9. In a transistorized television receiver for television signals which include a video signal component and a synchronizing signal component of an amplitude exceeding the peak amplitude of the video signal component, and which may include noise bursts of an amplitude exceeding the peak amplitude of the synchronizing signal component, the combination including: means for receiving said television signal and converting the same to an intermediate frequency signal; an intermediate frequency amplifier including a signal translating transistor having emitter, base and collector electrodes, which transistor is adapted to be driven into saturated conduction by said noise bursts, with said noise bursts being detected by the base-to-collector diode of said signal translating transistor; means connected to the collector electrode of said signal translating transistor to provide a bypass to ground reference potential for said intermediate frequency signal; means including a video detector coupled with said intermediate frequency amplifier for providing a composite video signal, which signal includes synchronizing signals of a given polarity and which may include noise impulses of the same polarity; a video amplifier stage for coupling said composite video signal to utilization means; automatic gain control circuit means including a time gated transistor having base, collector and emitter electrodes, with the base electrode of said time gated transistor coupled to said video amplifier stage to derive a composite video signal therefrom, and with the collector electrode of said time gated transistor coupled to circuit means for applying a gain control signal to select stages of the receiver; circuit means including a synchronizing signal separator transistor having base, collector and emitter electrodes, with a self-biasing network coupling the base electrode of said synchronizing signal separator transistor to said video amplifier stage to derive a composite video signal therefrom, said synchronizing signal separator transistor being responsive to said composite video signal to produce output pulses in the presence of the synchronizing signal component thereof; a noise gate transistor having base, collector and emitter electrodes, with the collector and emitter electrodes of said noise gate transistor series connected between the emitter electrodes of said time gated transistor and said synchronizing signal separator transistor and a reference potential; means for biasing said noise gate transistor to produce a state of saturated conduction therein in the presence of synchronizing signals at the input electrode of said time gated transistor and said synchronizing signal transistor; and means for coupling the input electrode of said noise gated transistor to the collector electrode of said signal translating transistor of said intermediate frequency amplifier to derive detected noise bursts therefrom, with said detected noise bursts being of a plurality to cause said noise gate transistor to become non-conductive, thereby disabling said time gated transistor and said synchronizing signal separator transistor in the presence of said noise bursts.

10. A noise gate circuit for a superheterodyne receiver including circuit means for translating signals of a selected frequency, which signals may include impulse noise bursts exceeding the maximum amplitude thereof, the combination including a plurality of amplifier stages having at least one transistor with a plurality of electrodes, means providing automatic gain control in said receiver so that the signal level in said one transistor is substantially independent of incoming signal strength, means for biasing said one transistor to provide a quiescent operating point such that noise impulses exceeding the maximum level of said translated signals drives said transistor into saturated conduction, circuit means responsive to unidirectional noise impulses to disable selected circuits of the receiver which are adversely affected by noise impulses exceeding the maximum level of said translated signals, means for bypassing said translated signals to a reference potential at one electrode of said one transistor, and circuit means coupling said one electrode to said disabling circuit means, whereby detected unidirectional noise impulses appearing at said one electrode are supplied to said disabling circuit means.

11. A noise gate circuit for a superheterodyne receiver having circuit means for translating signals of a selected frequency, which signals may include impulse noise bursts exceeding the maximum amplitude thereof, the combination including a plurality of amplifier stages having at least one transistor with base, collector and emitter electrodes, means providing automatic gain control in said receiver so that the signal level in said one transistor is substantially independent of incoming signal strength, means for biasing said one transistor to provide a quiescent operating point such that noise impulses exceeding the maximum level of said translated signals derive said transistor into saturated conduction, with said noise bursts being detected by the emitter-to-base junction of said transistor, circuit means responsive to unidirectional noise impulses to disable selected circuits of the receiver which are adversely affected by noise impulses exceeding the maximum level of said translated signals, means for bypassing said translated signals to a reference potential at the emitter electrode of said transistor, and circuit means coupling said emitter electrode to said disabling circuit means, whereby said detected unidirectional noise impulses appearing at said emitter electrode are supplied to said disabling circuit means.

12. A noise gate circuit for a superheterodyne receiver having circuit means for translating signals of a selected frequency, which translated signals may include impulse noise bursts exceeding the maximum amplitude thereof, the combination including a plurality of amplifier stages including at least one transistor with base, collector and emitter electrodes, circuit means responsive to unidirectional noise impulses to disable selected circuits of the receiver which are adversely affected by noise impulses exceeding the maximum level of said translated signals, means for providing automatic gain control in said receiver so that the signal level in said one transistor is substantially independent of incoming signal strength, means for biasing said one transistor to provide a quiescent operating point such that noise impulses exceeding the maximum level of said signal drive said transistor into saturated conduction, with said noise bursts being detected by the base-to-collector junction of said transistor, means for bypassing said translated signals to a reference potential at the collector electrode of said transistor, and means connecting said collector electrode to said disabling circuit means, whereby unidirectional noise impulses appearing at said collector electrode are supplied to said disabling circuit means.

No references cited.

DAVID G. REDINBAUGH, *Primary Examiner.*